(12) United States Patent
Yoo et al.

(10) Patent No.: US 11,594,776 B2
(45) Date of Patent: Feb. 28, 2023

(54) BATTERY MODULE INCLUDING HEAT SHRINKABLE TUBE

(71) Applicant: LG Chem, Ltd., Seoul (KR)

(72) Inventors: Jae-Min Yoo, Daejeon (KR); Eun-Gyu Shin, Daejeon (KR); Hee-Jun Jin, Daejeon (KR); Dal-Mo Kang, Daejeon (KR); Jeong-O Mun, Daejeon (KR)

(73) Assignee: LG Energy Solution, Ltd.

( * ) Notice: Subject to any disclaimer, the term of this patent is extended or adjusted under 35 U.S.C. 154(b) by 189 days.

(21) Appl. No.: 16/961,065

(22) PCT Filed: Jul. 3, 2019

(86) PCT No.: PCT/KR2019/008173
§ 371 (c)(1),
(2) Date: Jul. 9, 2020

(87) PCT Pub. No.: WO2020/009484
PCT Pub. Date: Jan. 9, 2020

(65) Prior Publication Data
US 2020/0343499 A1  Oct. 29, 2020

(30) Foreign Application Priority Data
Jul. 3, 2018 (KR) .................. 10-2018-0077299

(51) Int. Cl.
*H01M 10/00* (2006.01)
*H01M 50/20* (2021.01)
(Continued)

(52) U.S. Cl.
CPC ......... *H01M 50/20* (2021.01); *H01M 10/625* (2015.04); *H01M 10/647* (2015.04);
(Continued)

(58) Field of Classification Search
CPC .. H01M 50/20; H01M 10/625; H01M 10/647; H01M 10/653; H01M 50/183;
(Continued)

(56) References Cited

U.S. PATENT DOCUMENTS 3,977,906 A * 8/1976 Beatty ................ H01M 50/543
429/185
2005/0208375 A1   9/2005 Sakurai
(Continued)

FOREIGN PATENT DOCUMENTS

CN     106025423 A     10/2016
DE  102007063194 A1     6/2009
(Continued)

OTHER PUBLICATIONS

International Search Report for Application No. PCT/KR2019/008173 dated Oct. 28, 2019, 2 pages.
(Continued)

*Primary Examiner* — Nicholas P D'Aniello
(74) *Attorney, Agent, or Firm* — Lerner, David, Littenberg, Krumholz & Mentlik, LLP (57) ABSTRACT

A battery module includes a heat-shrinkable tube serving as a module housing. The battery module includes a cell assembly having a plurality of pouch-type secondary batteries; a bus bar assembly having a bus bar frame and a bus bar mounted to an outer surface of the bus bar frame; and a heat-shrinkable tube formed to be shrunk by heat and configured so that the cell assembly is located therein, the heat-shrinkable tube being provided to surround a side surface of the cell assembly and a portion of the bus bar assembly.

15 Claims, 6 Drawing Sheets

(51) Int. Cl.
  *H01M 10/625* (2014.01)
  *H01M 10/647* (2014.01)
  *H01M 10/653* (2014.01)
  *H01M 50/24* (2021.01)
  *H01M 50/183* (2021.01)
  *H01M 50/502* (2021.01)

(52) U.S. Cl.
  CPC ....... *H01M 10/653* (2015.04); *H01M 50/183* (2021.01); *H01M 50/24* (2021.01); *H01M 50/502* (2021.01); *H01M 2220/20* (2013.01)

(58) Field of Classification Search
  CPC .............. H01M 50/24; H01M 50/502; H01M 2220/20; H01M 50/202; H01M 50/227; H01M 50/247; H01M 10/655; H01M 50/211; H01M 50/238; H01M 10/613; Y02E 60/10
  See application file for complete search history.

(56) References Cited

U.S. PATENT DOCUMENTS

| | | | |
|---|---|---|---|
| 2009/0061289 A1* | 3/2009 | Hamada | H01M 50/308 29/623.2 |
| 2011/0090614 A1 | 4/2011 | Guerin et al. | |
| 2016/0233465 A1 | 8/2016 | Lee et al. | |
| 2017/0279169 A1 | 9/2017 | Obrist et al. | |
| 2018/0019508 A1 | 1/2018 | Lee et al. | |
| 2018/0175345 A1 | 6/2018 | Schmid-Schoenbein | |
| 2018/0194235 A1 | 7/2018 | Kim et al. | |
| 2020/0388805 A1* | 12/2020 | Yoo | H01M 10/625 |

FOREIGN PATENT DOCUMENTS

| | | | | |
|---|---|---|---|---|
| EP | 3331059 | A1 | 6/2018 | |
| JP | 01232656 | A * | 9/1989 | H01M 10/126 |
| JP | 2001167747 | A | 6/2001 | |
| JP | 2004164981 | A | 6/2004 | |
| JP | 2005135637 | A | 5/2005 | |
| JP | 2006019177 | A | 1/2006 | |
| JP | 2008066000 | A | 3/2008 | |
| JP | 2011508366 | A | 3/2011 | |
| JP | 2013051048 | A | 3/2013 | |
| JP | 2017085695 | A | 5/2017 | |
| JP | 2018502431 | A | 1/2018 | |
| KR | 20050093699 | A | 9/2005 | |
| KR | 20160016500 | A | 2/2016 | |
| KR | 20170046330 | A | 5/2017 | |
| KR | 20170057430 | A | 5/2017 | |
| KR | 20170103232 | A | 9/2017 | |
| WO | 9701871 | A1 | 1/1997 | |
| WO | 2013097968 | A1 | 7/2013 | |

OTHER PUBLICATIONS

Extended European Search Report including Written Opinion for Application No. 19831023.7 dated Mar. 15, 2021, pp. 1-8.
Search Report dated Feb. 23, 2022 from Office Action for Chinese Application No. 201980008040.1 issued Mar. 1, 2022. 2 pgs. (see p. 1, categorizing the cited references).

* cited by examiner

BATTERY MODULE INCLUDING HEAT SHRINKABLE TUBE

CROSS-REFERENCE TO RELATED APPLICATIONS

The present application is a national phase entry under 35 U.S.C. § 371 of International Application No. PCT/KR2019/008173, filed Jul. 3, 2019, published in Korean, which claims priority to Korean Patent Application No. 10-2018-0077299 filed on Jul. 3, 2018 in the Republic of Korea, the disclosures of which are incorporated herein by reference.

TECHNICAL FIELD

The present disclosure relates to a battery module including a heat-shrinkable tube, and more particularly, to a battery module having excellent cooling efficiency and allowing easy recycling of inner components at disposal by applying a heat-shrinkable tube serving as a module housing to the battery module.

BACKGROUND ART

In recent years, the demand for portable electronic products such as notebooks, video cameras, mobile phones, or the like is rapidly increasing, and the development of electric vehicles, energy storage batteries, robots, satellites, or the like is in earnest. For this reason, high-performance secondary batteries enabling repeated charging and discharging are being actively researched.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery case, hermetically containing the electrode assembly together with an electrolyte.

In addition, the lithium secondary battery may be classified into a can-type secondary battery in which the electrode assembly is included in a metal can and a pouch-type secondary battery in which the electrode assembly is included in a pouch made of aluminum laminate sheets, depending on the shape of the exterior.

Among them, the pouch-type secondary battery may be used to configure a battery module that includes a module housing made of a hard material and accommodating a plurality of secondary batteries, and a bus bar assembly configured to electrically connect the plurality of secondary batteries.

In addition, in the conventional battery module, in many cases, the module housing is implemented using a plastic or metal that is a hard material. However, the module housing made of a hard material has a great difficulty in disassembling the module housing from the battery module for recycling the battery module with a defect. That is, if the process of cutting the module housing using a cutting tool is performed for recycling, the cutting tool is likely to damage or ignite the plurality of secondary batteries, which is a serious problem in safety.

Also, if the module housing of the battery module is implemented with a hard material, a lot of empty spaces may be easily formed between the module housing and the plurality of secondary batteries accommodated therein. The air located in the empty spaces may greatly deteriorate the cooling efficiency of the battery module. Moreover, since the empty space of the module housing have different sizes at the plurality of secondary batteries, the heat dissipation efficiency may be different for the plurality of secondary batteries, resulting in irregular thermal balance of the battery module. In this case, the life span of the battery module may be greatly reduced.

DISCLOSURE

Technical Problem

Therefore, the present disclosure is designed to solve the problems of the related art, and therefore the present disclosure is directed to providing a battery module, which may have excellent cooling efficiency and allow easy recycling of inner components at disposal by applying a heat-shrinkable tube serving as a module housing to the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a cell assembly including a plurality of pouch-type secondary batteries having electrode leads formed to protrude in a front and rear direction and stacked on each other in a left and right direction;

a bus bar assembly located at a front side or a rear side of the cell assembly at which the electrode leads are formed, the bus bar assembly including a bus bar frame having a perforation hole through which at least one of the electrode leads protrudes and a bus bar mounted to an outer surface of the bus bar frame and having a conductive metal to electrically connect the plurality of pouch-type secondary batteries; and a heat-shrinkable tube formed to be shrunk by heat and configured so that the cell assembly is located therein, the heat-shrinkable tube being provided to surround a side surface of the cell assembly and a portion of the bus bar assembly.

Also, the heat-shrinkable tube may be configured to be in contact with a part of an accommodation portion of a secondary battery located at an outermost side in the left and right direction, among the plurality of pouch-type secondary batteries.

Moreover, the heat-shrinkable tube may have an uneven structure formed corresponding to an outer surface of sealing portions of the plurality of pouch-type secondary batteries.

In addition, a plurality of embossing structures partially ridged in an outer direction may be formed at an outer surface of the heat-shrinkable tube.

Also, the battery module may further comprise a thermally conductive adhesive interposed between the cell assembly and the heat-shrinkable tube.

Further, the thermally conductive adhesive may cover an entire side portion of the plurality of pouch-type secondary batteries.

In addition, an interposing portion of the thermally conductive adhesive may be disposed between adjacent secondary batteries of the plurality of stacked pouch-type secondary batteries.

Also, the thermally conductive adhesive may include a filler having a metal in a dispersed form.

In addition, in another aspect of the present disclosure, there is also provided a battery pack, which includes at least one battery module as above.

Also, in another aspect of the present disclosure, there is also provided a vehicle, which includes the battery pack.

Advantageous Effects

According to an embodiment of the present disclosure, since the battery module includes the heat-shrinkable tube to serve as a module housing, it is possible to significantly reduce the weight of the battery module. Also, when recycling inner components of the battery module, the heat-shrinkable tube may be easily separated and removed using a simple cutting tool, thereby significantly reducing damage to or ignition of the plurality of secondary batteries, caused by the use of the dangerous cutting tool.

In addition, according to another embodiment of the present disclosure, since the heat-shrinkable tube is heat-shrunk by applying heat in a state where the cell assembly is accommodated therein and the heat-shrunk portion comes into close contact with a portion of the cell assembly, it is possible to realize a uniform heat conduction distance between the cell assembly and the heat-shrinkable tube as a whole. As a result, the battery module of the present disclosure may quickly discharge out the heat generated during operation of the battery module through the heat-shrinkable tube in close contact with the outer surface of the cell assembly, thereby maximizing the cooling efficiency of the battery module.

Moreover, according to an embodiment of the present disclosure, since the heat-shrinkable tube is in close contact with the outer surfaces of the sealing portions of the plurality of pouch-type secondary batteries to form an uneven structure, it is possible to minimize an empty space that may be generated between the heat-shrinkable tube and the plurality of secondary batteries. Also, it is possible to reduce the amount of air occupied in the empty space, to dramatically increase the thermal conductivity of heat generated from the secondary batteries, and to improve the cooling efficiency of the battery module.

In addition, according to an embodiment of the present disclosure, since a thermally conductive adhesive is added to be interposed between the cell assembly and the heat-shrinkable tube, it is possible to minimize an empty space that may be generated between the heat-shrinkable tube and the plurality of secondary batteries, and the heat generated from the secondary batteries may be thermally conducted with high efficiency, thereby improving the cooling efficiency of the battery module.

Further, according to an embodiment of the present disclosure, since the thermally conductive adhesive includes a filler having a metal with excellent thermal conductivity, it is possible to further improve the thermal conductivity of the thermally conductive adhesive, thereby ultimately improving the cooling efficiency of the battery module. Moreover, since the filler having a metal may further increase the mechanical rigidity of the thermally conductive adhesive, it is possible to effectively protect the cell assembly accommodated inside the heat-shrinkable tube against external impact.

In addition, according to an embodiment of the present disclosure, since the heat-shrinkable tube includes a plurality of embossing structures, it is possible to effectively absorb external impact and minimize the impact applied to the cell assembly accommodated therein, thereby effectively increasing the safety and durability of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
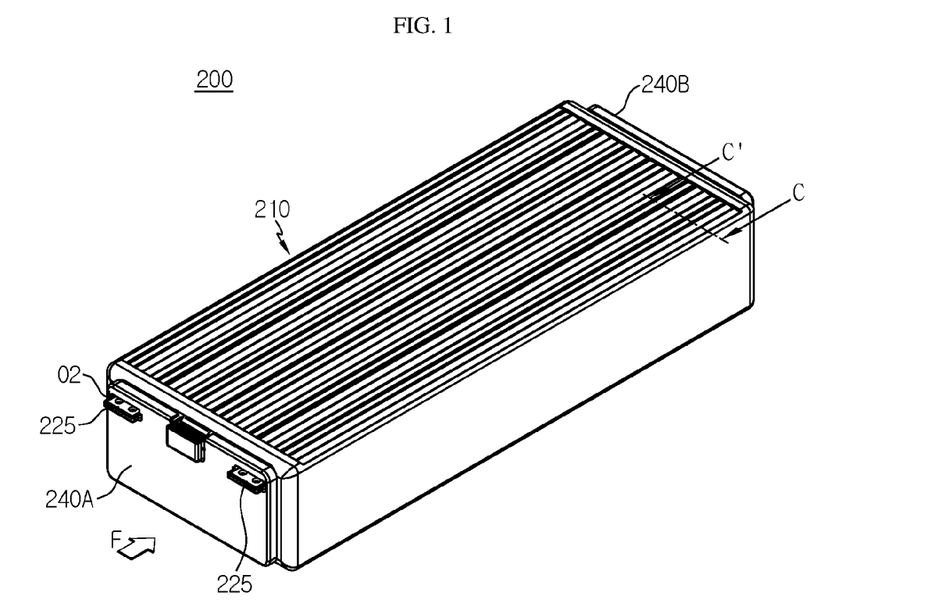
FIG. 1 is a perspective view schematically showing a battery module according to an embodiment of the present disclosure.
Figure 2:
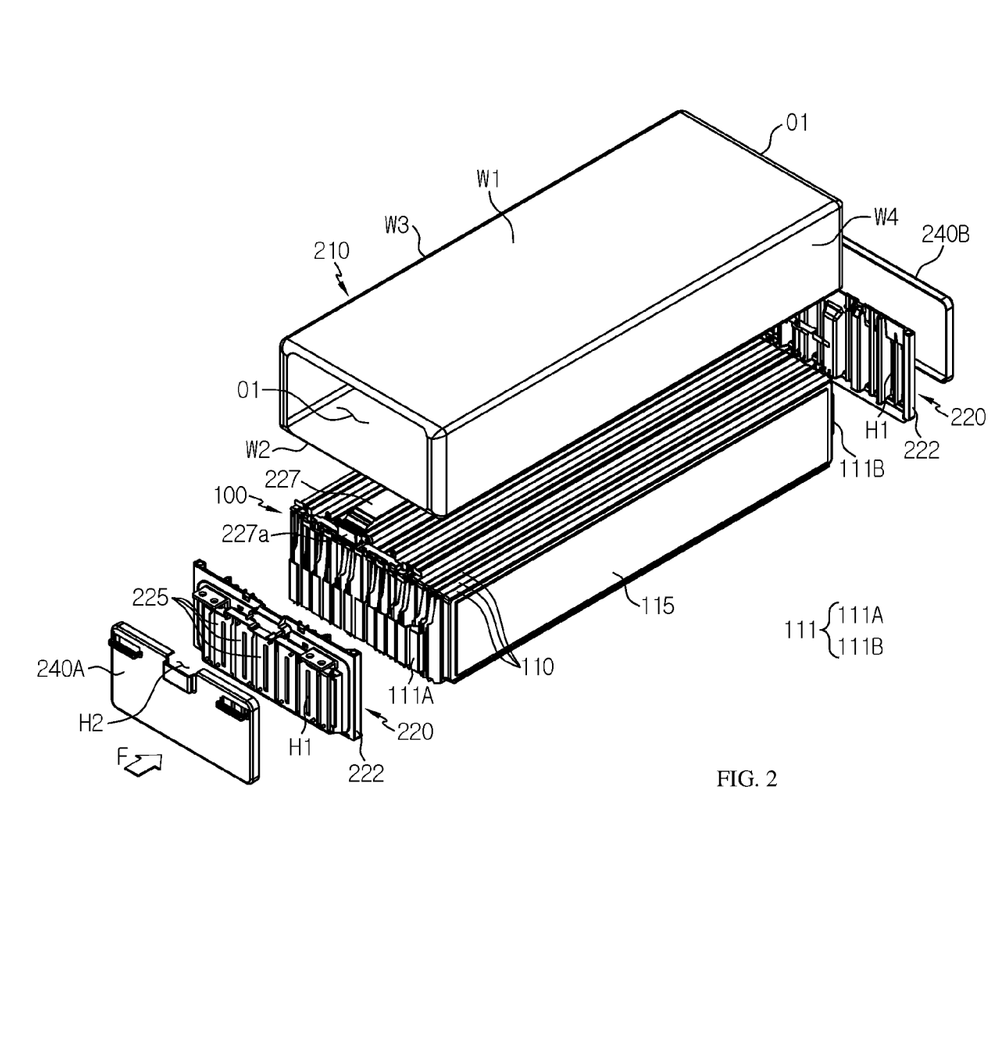
FIG. 2 is an exploded perspective view schematically showing the battery module according to an embodiment of the present disclosure.

FIG. 1 is a perspective view schematically showing a battery module according to an embodiment of the present disclosure. FIG. 2 is an exploded perspective view schematically showing the battery module according to an embodiment of the present disclosure. In addition, FIG. 3 is a side view schematically showing a pouch-type secondary battery, employed at the battery module according to an embodiment of the present disclosure.

Figure 3:
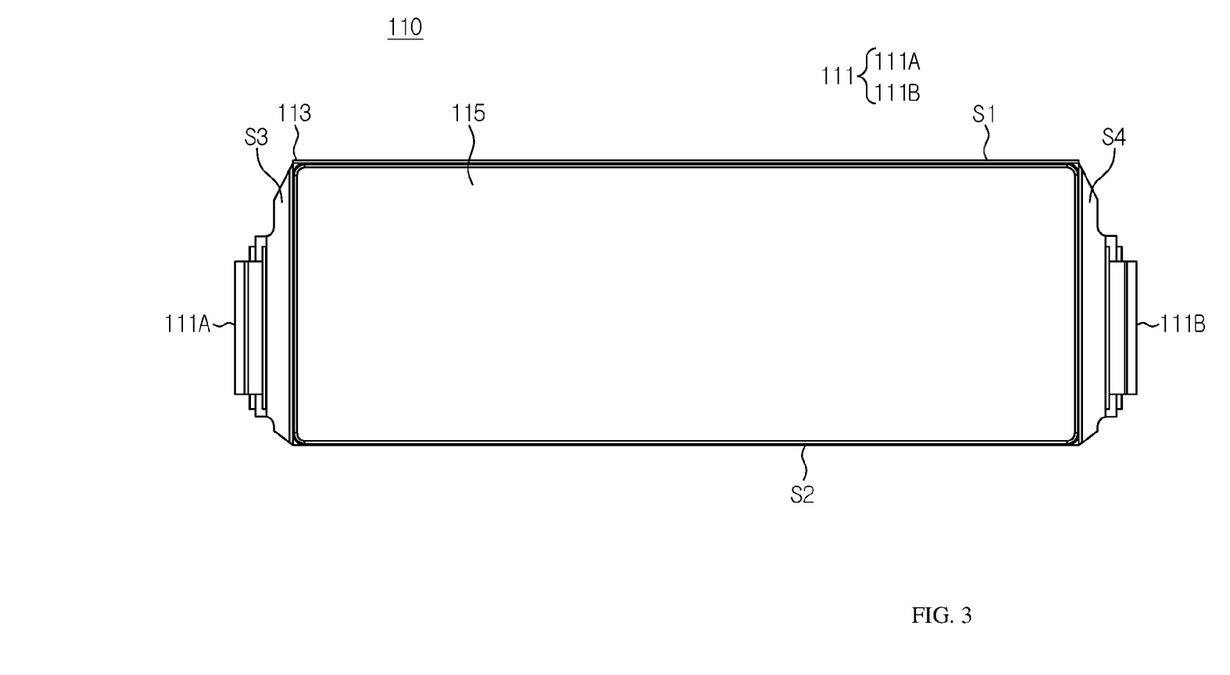
FIG. 3 is a side view schematically showing a pouch-type secondary battery, employed at the battery module according to an embodiment of the present disclosure.

Referring to FIGS. 1 to 3, a battery module 200 of the present disclosure may include a cell assembly 100, a bus bar assembly 220, two module covers 240A, 240B, and a heat-shrinkable tube 210.

Here, the cell assembly 100 may include a plurality of secondary batteries 110.

At this time, the secondary battery 110 may be a pouch-type secondary battery 110. In particular, the pouch-type secondary battery 110 may include an electrode assembly, an electrolyte and a pouch exterior 113.

Here, the electrode assembly may be configured such that at least one positive electrode plate and at least one negative electrode plate are disposed with a separator interposed therebetween. More specifically, the electrode assembly may be classified into a wound type in which one positive electrode plate and one negative electrode plate are wound together with a separator, a stacking type in which a plurality of positive electrode plates and a plurality of negative electrode plates are alternately stacked with a separator interposed therebetween, and the like.

Also, the pouch exterior 113 may be configured to have an outer insulating layer, a metal layer and an inner adhesive layer. The pouch exterior 113 may be configured to include a metal thin film, for example an aluminum thin film, in order to protect inner components such as the electrode assembly and the electrolyte, to enhance electrochemical properties by the electrode assembly and the electrolyte, and to improve heat dissipation. In addition, the aluminum thin film may be interposed between insulating layers made of an insulating material so as to secure electrical insulation with components inside the secondary battery 110 such as the electrode assembly and the electrolyte or with other components outside the secondary battery 110.

In particular, the pouch exterior 113 may be composed of two pouches, at least one of which may have a concave inner space formed therein. In addition, the electrode assembly may be accommodated in the inner space of the pouch. Also, sealing portions S1, S2, S3, S4 are provided at outer circumferential surfaces of two pouches, and the sealing portions S1, S2, S3, S4 of the two pouches are fused to each other to seal the inner space in which the electrode assembly is accommodated.

Each pouch-type secondary battery 110 may include an electrode lead 111 protruding in the front and rear direction, and the electrode lead 111 may include a positive electrode lead 111A and a negative electrode lead 111B.

In more detail, the electrode lead 111 may be configured to protrude forward or rearward from the sealing portions S3, S4 located at the outer circumference of the front or rear side of the pouch exterior 113. In addition, the electrode lead 111 may serve as an electrode terminal of the secondary battery 110. For example, as shown in FIG. 2, one electrode lead 111 may be configured to protrude forward from the secondary battery 110, and the other electrode lead 111 may configured to protrude rearward from the secondary battery 110.

Thus, according to this configuration of the present disclosure, in one secondary battery 110, there is no interference between the positive electrode lead 111A and the negative electrode lead 111B, thereby widening the area of the electrode lead 111. In addition, a welding process between the electrode lead 111 and a bus bar 225 may be performed more easily.

In addition, a plurality of pouch-type secondary batteries 110 may be included in the battery module 200 and arranged to be stacked in at least one direction. For example, as shown in FIG. 2, a plurality of pouch-type secondary batteries 110 may be stacked side by side on each other in a right and left direction. At this time, each pouch-type secondary batteries 110 may be disposed to stand approximately perpendicular to the ground, when being observed in the F direction, such that two broad surfaces are located at right and left sides, respectively, and the sealing portions S1, S2, S3, S4 are located at upper, lower, front and rear sides. In other words, each secondary battery 110 may be configured to stand in an upper and lower direction.

Meanwhile, the terms indicating directions such as front, rear, left, right, upper and lower directions used herein may be changed depending on the position of an observer or the shape of an object. For the sake of convenience of description, in the present specification, directions are classified into front, rear, left, right, upper and lower directions, based on the F direction.

The configuration of the pouch-type secondary battery 110 described above is obvious to those skilled in the art and thus will not be described in detail here. In addition, the cell assembly 100 according to the present disclosure may employ various kinds of secondary batteries known at the time of filing of this application.

Meanwhile, referring to FIG. 2 again, the bus bar assembly 220 may be located at a front side or a rear side of the cell assembly 100 at which the electrode leads 111 are formed. In addition, the bus bar assembly 220 may include a bus bar frame 222. Further, the bus bar frame 222 may include an electrically insulating material. For example, the electrically insulating material may be plastic.

Further, the bus bar assembly 220 may include a bus bar 225 having a conductive metal to electrically connect the plurality of pouch-type secondary batteries 110. Also, the bus bar 225 may be mounted to an outer surface of the bus bar frame 222. Specifically, the bus bar 225 may be mounted and fixed to the outer side of the bus bar frame 222. In addition, the bus bar 225 may be provided in plural so that the plurality of bus bars 225 are arranged side by side in a left and right direction at the outer surface of the bus bar frame 222. Further, the plurality of bus bars 225 may have different electrical polarities depending on the location of the bus bar frame 222. The bus bar 225 may have a conductive metal. The conductive metal may be an alloy having at least one of aluminum, copper and nickel.

Here, the "outer side" means a side located at an outer portion based on the center of the battery module.

Further, the bus bar frame 222 may have a perforation hole H1 through which at least one electrode lead 111 protrudes. Specifically, the ends of the plurality of electrode leads 111 may penetrate through the perforation hole H1 of the bus bar frame 222 to protrude from the secondary battery 110 in a front and rear direction.

Accordingly, the perforation hole H1 may be located and sized such that the end of the electrode lead 111 inserted through the bus bar frame 222 is easily contacted and connected with a body of the bus bar 225.

Referring to FIG. 1 again, the battery module 200 of the present disclosure may include two module covers 240A, 240B configured to cover the outer surfaces of the bus bar assemblies 220 located at a front side and a rear side thereof, respectively. Specifically, the module cover 240A located at the front side of the battery module 200 may be configured to cover at least a part of the outer portion of the bus bar assembly 220 except for external input/output terminal portions of the bus bar 225. That is, the external input/output terminal portions of the bus bar 225 may be shaped to protrude out through an opening O2 formed in the module cover 240A.

Also, the module cover 240B located at the rear side of the battery module 200 may be configured to cover the bus bar 225 mounted to the bus bar assembly 220.

In addition, the module cover 240 may have an open portion H2 formed at an upper portion thereof so that a connector 227a configured to be electrically connected to an external BMS device of a voltage sensing member 227 may be exposed to the outside.

Figure 4:
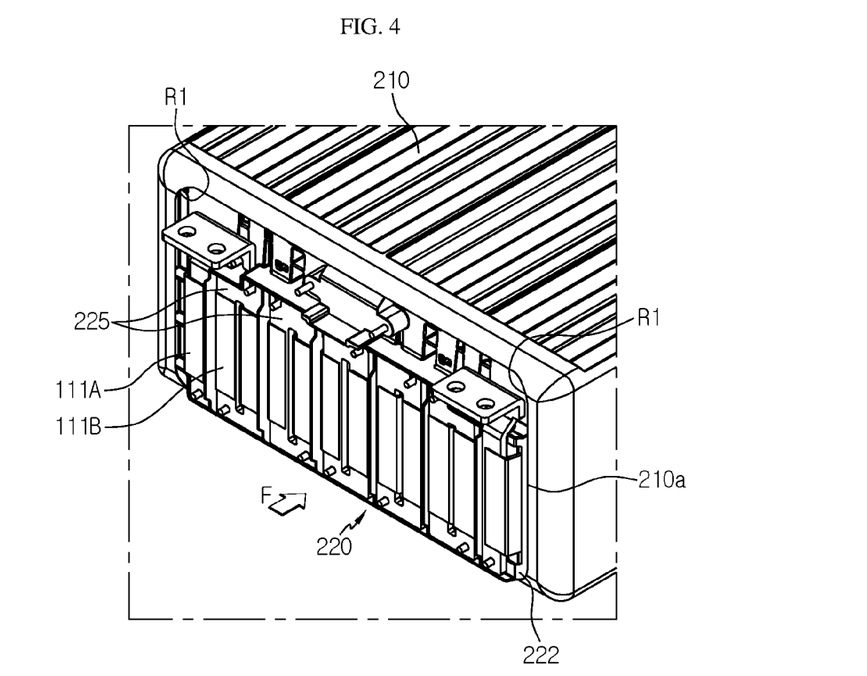
FIG. 4 is a perspective view schematically showing a cell assembly, a bus bar assembly and a heat-shrinkable tube, employed at the battery module according to an embodiment of the present disclosure.

Meanwhile, FIG. 4 is a perspective view schematically showing a cell assembly, a bus bar assembly and a heat-shrinkable tube, employed at the battery module according to an embodiment of the present disclosure.

Referring to FIGS. 2 and 4, the heat-shrinkable tube 210 may have a form shrunk by heat. To this end, the heat-shrinkable tube 210 may have a heat shrinkable material whose volume is reduced at a particular temperature. For example, the heat-shrinkable tube 210 may be made using a polyester resin, a polyolefin resin or a polyphenylene sulfide resin. More specifically, the heat-shrinkable tube 210 may include at least one of polyvinyl chloride, polystyrene, polyethylene terephthalate (PET), polyolefin, nylon, polyvinyl chloride (PVC) and polybutylene terephthalate (PBT).

In addition, the heat-shrinkable tube 210 may include an outer wall to protect the cell assembly 100 against external impact. For example, the heat-shrinkable tube 210 may be configured to form an inner space for accommodating the cell assembly 100 and may include an outer wall W1, a right wall W4, a left wall W3 and a lower wall W2 formed at up, down, left and right sides.

Further, the heat-shrinkable tube 210 may be configured such that the cell assembly 100 is located therein. At this time, the heat-shrinkable tube 210 may be configured to surround a portion of the cell assembly 100.

Specifically, the heat-shrinkable tube 210 may be configured to be in close contact with a portion of an accommodation portion 115 of the secondary battery 110 located at the outermost side in the left and right direction among the plurality of pouch-type secondary batteries 110, when viewed in the F direction.

For example, as shown in FIGS. 1 and 2, the right wall W4 of the heat-shrinkable tube 210 may be configured to be in close contact with the outer surface of the accommodation portion 115 of the secondary battery 110 located at the rightmost end of the cell assembly 100. In addition, the left wall W3 of the heat-shrinkable tube 210 may be configured to be in close contact with the outer surface of the accommodation portion 115 of the secondary battery 110 located at the leftmost end of the cell assembly 100.

Thus, according to this configuration of the present disclosure, the heat-shrinkable tube 210 is heat-shrunk by applying heat thereto in a state where the cell assembly 100 is accommodated therein, and the heat-shrunk portion may be in close contact with a portion of the cell assembly 100, thereby implementing a uniform thermal conduction distance between the cell assembly 100 and the heat-shrinkable tube 210 as a whole. As a result, the battery module 200 of the present disclosure may quickly discharge heat generated during operation of the battery module 200 to the outside through the heat-shrinkable tube 210 with high thermal conductivity and in close contact, thereby maximizing the cooling efficiency of the battery module 200.

In particular, in the present disclosure, since the left and right walls W3, W4 of the heat-shrinkable tube 210 are brought into close contact with the outer surface of the accommodation portion 115 where the heat generation of the secondary battery 110 of the cell assembly 100 is concentrated, it is possible to improve the cooling efficiency of the battery module 200.

Further, the heat-shrinkable tube 210 may include a transparent material. Accordingly, if the battery module 200 includes the voltage sensing member 227, the state of the voltage sensing member 227 and the cell assembly 100 accommodated in the heat-shrinkable tube 210 may be visually checked, thereby facilitating the maintenance of the battery module 200.

Figure 5:
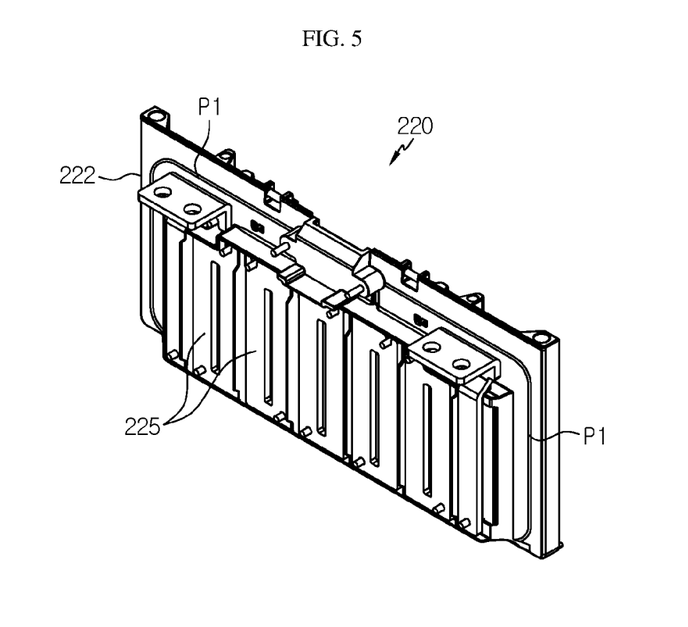
FIG. 5 is a perspective view schematically showing the bus bar assembly, employed at the battery module according to an embodiment of the present disclosure.

FIG. 5 is a perspective view schematically showing the bus bar assembly, employed at the battery module according to an embodiment of the present disclosure.

Referring to FIG. 5 along with FIG. 4, the heat-shrinkable tube 210 may be configured to surround a portion of the outer surface of the bus bar assembly 220. Specifically, when viewed in the F direction, the front end and the rear end of the heat-shrinkable tube 210 may surround an outer circumference of the outer surface of the bus bar frame 222 of the bus bar assembly 220. At this time, an open portion O1 (FIG. 2) formed at each of the front end and the rear end of the heat-shrinkable tube 210 may have a rectangular shape in a macroscopic view. In addition, the corner portions of the rectangular open portion O1 of the heat-shrinkable tube 210 may have a round shape R1.

For example, as shown in FIG. 4, the front end 210a of the heat-shrinkable tube 210 may be configured to surround the outer circumference of the outer surface of the bus bar frame 222 located at the front side of the cell assembly 100. Similarly, the rear end (not shown) of the heat-shrinkable tube 210 may be configured to surround the outer circumference of the outer surface of the bus bar frame 222 located at the rear side of the cell assembly 100.

Also, the front end 210a or the rear end of the heat-shrinkable tube 210 may be placed on the outer surface of the bus bar frame 222. In addition, a groove P1 may be formed so that a part of the front end 210a or the rear end of the heat-shrinkable tube 210 may be inserted therein. For example, as shown in FIG. 5, the groove P1 extending along the outer circumference of the bus bar frame 222 may be formed at the outer surface of the bus bar frame 222.

Thus, according to this configuration of the present disclosure, the heat-shrinkable tube 210 of the present disclosure may be configured to not only surround the outer surface of the cell assembly 100 but also surround a portion of the bus bar assembly 220 so as to be fixed to the front side and the rear side of the cell assembly 100 of the bus bar frame 222, respectively. Thus, a fixing member required to fix the bus bar assembly 220 to the cell assembly 100 may be omitted, thereby reducing manufacturing costs.

Further, since the groove P1 is additionally formed at the bus bar frame 222, a portion of the front end or the rear end of the heat-shrinkable tube 210 may be inserted into the groove P1 during the process of applying heat to the heat-shrinkable tube 210 at a predetermined temperature. Thus, the front end 210a or the rear end (not shown) of the heat-shrinkable tube 210 may be stably inserted and fixed, and the heat-shrinkable tube 210 may fix the bus bar assembly 220 with a high bonding force. Thus, it is possible to prevent the bus bar assembly 220 from moving, and the durability of the battery module 200 may be improved.

Figure 6:
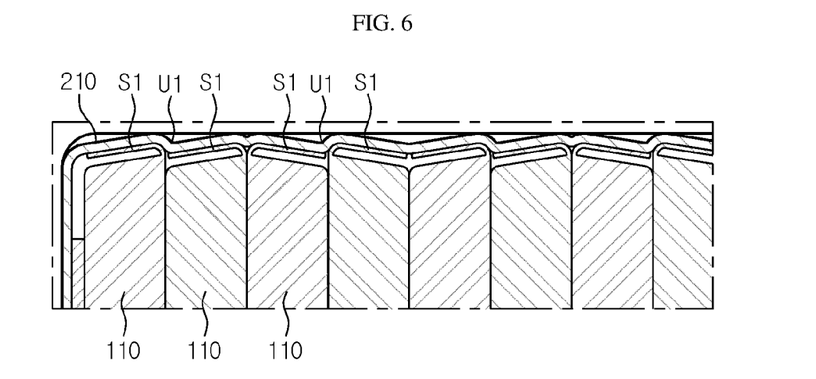
FIG. 6 is a partial side-sectioned view schematically showing a portion of a side surface of the battery module, taken along the line C-C' of FIG. 1.

FIG. 6 is a partial side-sectioned view schematically showing a portion of a side surface of the battery module, taken along the line C-C' of FIG. 1.

Referring to FIG. 6 along with FIGS. 2 and 3, a portion of the heat-shrinkable tube 210 may come into close contact with the outer surface of the sealing portion S1 of the plurality of pouch-type secondary batteries 110. Specifically, the outer wall W1 of the heat-shrinkable tube 210 may be configured to be in close contact with the sealing portion S1 located at the upper portion of the pouch-type secondary battery 110. Moreover, though not shown in FIG. 6, the lower wall W2 of the heat-shrinkable tube 210 may be configured to be in close contact with the sealing portion S2 located at the lower portion of the pouch-type secondary battery 110.

In addition, the heat-shrinkable tube 210 may have an uneven structure U1 formed corresponding to the outer surface of the sealing portion S1 located at the upper portion of the plurality of pouch-type secondary batteries 110 or the sealing portion S2 located at the lower portion thereof. That is, the uneven structure U1 may have a curved shape along the plurality of sealing portions S1 of the secondary batteries 110.

For example, as shown in FIG. 6, the outer wall W1 of the heat-shrinkable tube 210 may have the uneven structure U1 shaped corresponding to the outer surface of the sealing portion S1 located at the upper portion of each of the plurality of pouch-type secondary batteries 110. Similarly, the lower wall W2 of the heat-shrinkable tube 210 may have the uneven structure U1 shaped corresponding to the outer surface of the sealing portion S2 located at the lower portion of each of the plurality of pouch-type secondary batteries 110.

Thus, according to this configuration of the present disclosure, since the heat-shrinkable tube 210 heated to a predetermined temperature comes into close contact with the outer surface of the sealing portion S1 of each of the plurality of pouch-type secondary batteries 110 to form the uneven structure U1, it is possible to minimize an empty space that may be generated between the heat-shrinkable tube 210 and the plurality of secondary batteries 110, to reduce the amount of air occupied in the empty space, to significantly increase the thermal conductivity of heat generated from the secondary batteries 110, and to improve the cooling efficiency of the battery module 200.

Figure 7:
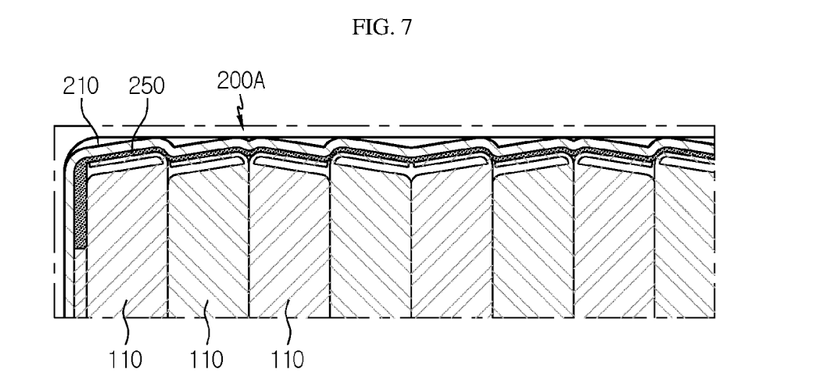
FIG. 7 is a partial side-sectioned view schematically showing a portion of a side surface of a battery module according to another embodiment of the present disclosure.

FIG. 7 is a partial side-sectioned view schematically showing a portion of a side surface of a battery module according to another embodiment of the present disclosure.

Referring to FIG. 7, the battery module 200A may further include a thermally conductive adhesive 250. Specifically, the thermally conductive adhesive 250 may be added to be interposed between the plurality of secondary batteries 110 of the cell assembly 100 and the heat-shrinkable tube 210. In addition, the thermally conductive adhesive 250 may be formed to cover the entire side portion of the plurality of pouch-type secondary batteries 110.

For example, as shown in FIG. 7, the battery module 200A may additionally include the thermally conductive adhesive 250 interposed between the plurality of secondary batteries 110 of the cell assembly 100 and the heat-shrinkable tube 210. In addition, the thermally conductive adhesive 250 may be shaped to extend along the outer surface of the plurality of pouch-type secondary batteries 110.

Further, the thermally conductive adhesive 250 may include a polymer resin or a silicon-based resin with high thermal conductivity and a filler. For example, the polymer resin may be a poly siloxane resin, a polyamide resin, a urethane resin or an epoxy resin. In addition, the thermally conductive adhesive 250 may include an adhesive material. For example, the adhesive material may be a material such as acrylic, polyester, polyurethane, rubber or the like.

Thus, according to this configuration of the present disclosure, if the thermally conductive adhesive 250 is added between the cell assembly 100 and the heat-shrinkable tube 210, an empty space that may be generated between the heat-shrinkable tube 210 and the plurality of secondary batteries 110 may be minimized, and thus it is possible to reduce the amount of air occupied in the empty space and dramatically increase the thermal conductivity of heat generated from the secondary battery 110, thereby improving the cooling efficiency of the battery module 200A.

Figure 8:
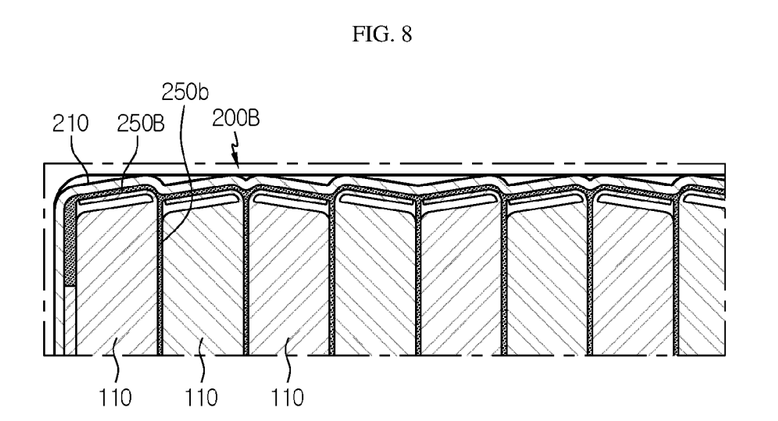
FIG. 8 is a partial side-sectioned view schematically showing a portion of a side surface of a battery module according to still another embodiment of the present disclosure.

FIG. 8 is a partial side-sectioned view schematically showing a portion of a side surface of a battery module according to still another embodiment of the present disclosure.

Referring to FIG. 8, in a battery module 200B according to still another embodiment, a portion of the thermally conductive adhesive 250B may flow between the plurality of stacked pouch-type secondary batteries 110 of the cell assembly 100 to be cured therein.

For example, as shown in FIG. 8, when the thermally conductive adhesive 250B is in a liquid state, the thermally conductive adhesive 250B may be introduced from the top to the bottom between the plurality of stacked pouch-type secondary batteries 110, and the introduced thermally conductive adhesive 250B is cured later to form an interposing portion 250B. That is, the interposing portion 250B may be located between the plurality of pouch-type secondary batteries 110 to bind the plurality of pouch-type secondary batteries 110 to each other.

Thus, according to this configuration of the present disclosure, since the thermally conductive adhesive 250B binds the plurality of secondary batteries 110 of the cell assembly 100 into a single unit, the cell assembly may be handled easily while the battery module 200B is being manufactured, and the durability of the battery module 200B may be further increased after the manufacture.

Moreover, the interposing portion 250b of the thermally conductive adhesive 250B may serve to absorb heat that is likely to accumulate between the plurality of secondary batteries 110 and conduct the absorbed heat out of the secondary batteries. Thus, in the present disclosure, the cooling efficiency of the battery module 200B may be further improved by forming the interposing portion 250b of the thermally conductive adhesive 250B.

Figure 9:
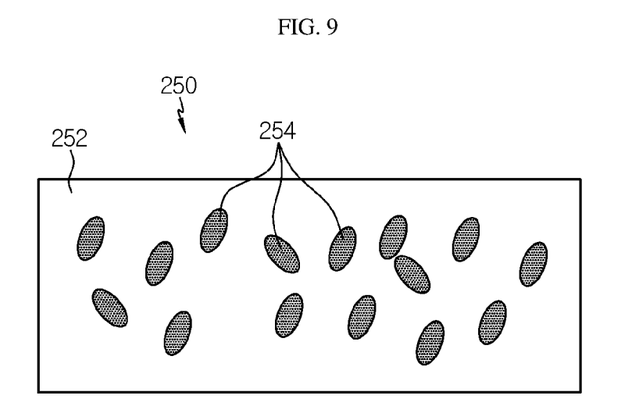
FIG. 9 is a perspective view schematically showing a thermally conductive adhesive, employed at the battery module of FIG. 7.

FIG. 9 is a perspective view schematically showing a thermally conductive adhesive, employed at the battery module of FIG. 7.

Referring to FIG. 9, the thermally conductive adhesive 250 of the battery module 200A of FIG. 7 may include a filler 254. Also, the filler 254 may include a metal with excellent thermal conductivity in the form of particles. For example, the metal may include at least one of silver, copper, tin and aluminum. In the thermally conductive adhesive 250, the filler 254 having a metal may be provided in a dispersed form.

For example, as shown in FIG. 9, the thermally conductive adhesive 250 may be configured such that the filler 254 made of metal particles is dispersed in a polymer resin 252.

Thus, according to this configuration of the present disclosure, since the thermally conductive adhesive 250 includes the filler 254 having a metal with excellent thermal conductivity, it is possible to further improve the thermal conductivity of the thermally conductive adhesive 250, thereby ultimately improving the cooling efficiency of the battery module 200.

Moreover, the filler 254 having a metal may further increase the mechanical rigidity of the thermally conductive adhesive 250. Accordingly, the thermally conductive adhesive 250 with high mechanical rigidity may effectively protect the cell assembly 100 accommodated in the heat-shrinkable tube 210 made of a soft material against external impact.

Figure 10:
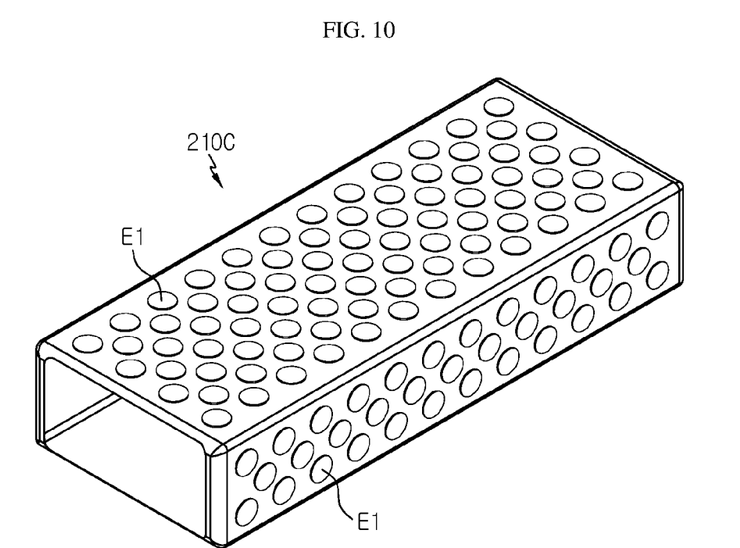
FIG. 10 is a perspective view schematically showing a heat-shrinkable tube, employed at the battery module according to an embodiment of the present disclosure.

FIG. 10 is a perspective view schematically showing a heat-shrinkable tube, employed at the battery module according to an embodiment of the present disclosure.

Referring to FIG. 10, a plurality of embossing structures E1 partially ridged in an outer direction may be formed at the outer surface of the heat-shrinkable tube 210C. Specifically, the plurality of embossing structures E1 partially ridged in an outer direction may be formed at the outer surface of at least one outer surface, among the outer wall W1, the lower wall W2, the left wall W3 and the right wall W4 of the heat-shrinkable tube 210C.

In addition, the embossing structure E1 may be a portion having a relatively greater thickness in the outer direction than the remaining portion where the embossing structure E1 of the heat-shrinkable tube 210C is not formed.

In another embodiment, the embossing structure E1 may contain air therein and may be configured to have high elasticity as a whole. Alternatively, the embossing structure E1 may contain a material with high elastic force, such as rubber.

For example, as shown in FIG. 10, the plurality of embossing structures E1 having a greater thickness in the outer direction than the remaining portions may be formed at the outer wall, the left wall and the right wall of the heat-shrinkable tube 210C.

Thus, according to this configuration of the present disclosure, since the plurality of embossing structures E1 are further formed at the heat-shrinkable tube 210C, it is possible to effectively absorb external shocks and minimize impacts applied to the cell assembly 100 accommodated therein, thereby effectively improving the safety and durability of the battery module 200.

Further, a battery pack (not shown) according to the present disclosure may include at least one battery module 200 according to the present disclosure. In addition, the battery pack according to the present disclosure may further include, in addition to the battery module 200, a pack case for accommodating the battery module 200, and various devices for controlling charge and discharge of the battery module 200, for example a battery management system (BMS), a current sensor, a fuse and the like.

In addition, the battery pack according to the present disclosure may be applied to a vehicle (not shown) such as an electric vehicle. In other words, the vehicle according to the present disclosure may include the battery pack according to the present disclosure.

Further, the energy storage system (not shown) may store power generated by the power generation unit and supplying the power to a power grid. In addition, the power grid may be a commercial grid or a grid of a small district. Moreover, in some cases, the energy storage system may be a power storage device that stores power at smart grid, and the energy storage system may be a load or a power converter that directly consumes the produced power.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery module | 100: cell assembly |
| 110: pouch-type secondary battery | 111: electrode lead |
| 220: bus bar assembly | 222: bus bar frame |
| 225: bus bar | 240A, 240B: module cover |
| 210: heat-shrinkable tube | |
| W1, W2, W3, W4: outer wall, lower wall, left wall, right wall | |
| U1: uneven structure | E1: embossing structure |
| 250: thermally conductive adhesive | |

INDUSTRIAL APPLICABILITY

The present disclosure relates to a battery module and a battery pack including the battery module. Also, the present disclosure is applicable to industries related to electronic devices or vehicles, which include the battery pack.

What is claimed is:
1. A battery module, comprising:
a cell assembly including a plurality of pouch-type secondary batteries having electrode leads formed to protrude in a front and rear direction and stacked on each other in a left and right direction, each of the pouch-type secondary batteries having a largest planar surface extending in the front and rear directions and up and down directions perpendicular to the front and rear directions and the left and right directions, the largest planar surface of each pouch-type secondary battery facing the largest planar surface of at least one adjacent one of the pouch-type secondary batteries;
a bus bar assembly located at a front side or a rear side of the cell assembly at which the electrode leads are formed, the bus bar assembly including a bus bar frame having a plurality of perforation holes, at least one of the electrode leads protruding through each of the plurality of perforation holes, and a bus bar mounted to an outer surface of the bus bar frame and having a conductive metal to electrically connect either all of the electrode leads protruding in the front direction or all of the electrode leads protruding in the rear direction of the plurality of pouch-type secondary batteries; and
a heat-shrinkable tube formed to be shrunk by heat and configured so that the cell assembly is located therein, the heat-shrinkable tube being provided to surround a side surface of the cell assembly and a portion of the bus bar assembly, the portion of the bus bar assembly being an outer circumference of the outer surface of the bus bar frame, the heat-shrinkable tube having an open portion exposing a central region of the bus bar assembly, the central region exposed at the open portion of the heat-shrinkable tube including locations at which all of the electrode leads protruding in the front direction or all of the electrode leads protruding in the rear direction protrude through the bus bar frame.

2. The battery module according to claim 1,
wherein the heat-shrinkable tube is configured to be in contact with a part of an accommodation portion of a secondary battery located at an outermost side in the left and right direction, among the plurality of pouch-type secondary batteries.

3. The battery module according to claim 1,
wherein the heat-shrinkable tube has an uneven structure formed corresponding to an outer surface of sealing portions of the plurality of pouch-type secondary batteries.

4. The battery module according to claim 1,
wherein a plurality of embossing structures partially ridged in an outer direction are formed at an outer surface of the heat-shrinkable tube.

5. The battery module according to claim 1, further comprising:
a thermally conductive adhesive interposed between the cell assembly and the heat-shrinkable tube.

6. The battery module according to claim 5,
wherein the thermally conductive adhesive covers an entire side portion of the plurality of pouch-type secondary batteries.

7. The battery module according to claim 5,
wherein an interposing portion of the thermally conductive adhesive is disposed between adjacent secondary batteries of the plurality of stacked pouch-type secondary batteries.

8. The battery module according to claim 5,
wherein the thermally conductive adhesive includes a filler having a metal in a dispersed form.

9. A battery pack, comprising at least one battery module according to claim 1.

10. A vehicle, comprising the battery pack according to claim 9.

11. The battery module according to claim 1,
wherein the heat-shrinkable tube is made of a polyester resin, a polyolefin resin, or a polyphenylene sulfide resin.

12. The battery module according to claim 1,
wherein the heat-shrinkable tube includes at least one of polyvinyl chloride, polystyrene, polyethylene terephthalate (PET), polyolefin, nylon, polyvinyl chloride (PVC) and polybutylene terephthalate (PBT).

13. The battery module according to claim 1,
wherein the heat-shrinkable tube includes a transparent material.

14. The battery module according to claim 5,
wherein the thermally conductive adhesive includes a polymer resin or a silicon-based resin and a filler.

15. The battery module according to claim 14,
wherein the thermally conductive adhesive includes the polymer resin, and the polymer resin is a poly siloxane resin, a polyamide resin, a urethane resin or an epoxy resin.

* * * * *